United States Patent
DeLuca

(10) Patent No.: US 7,949,154 B2
(45) Date of Patent: May 24, 2011

(54) METHOD AND SYSTEM FOR ASSOCIATING SOURCE INFORMATION FOR A SOURCE UNIT WITH A PRODUCT CONVERTED THEREFROM

(75) Inventor: Nicholas P. DeLuca, Washington, DC (US)

(73) Assignee: Cryovac, Inc., Duncan, SC (US)

( * ) Notice: Subject to any disclaimer, the term of this patent is extended or adjusted under 35 U.S.C. 154(b) by 1160 days.

(21) Appl. No.: 11/612,059

(22) Filed: Dec. 18, 2006

(65) Prior Publication Data
US 2008/0144880 A1 Jun. 19, 2008

(51) Int. Cl.
G06K 9/00 (2006.01)
G06F 19/00 (2006.01)

(52) U.S. Cl. ........................................ 382/110; 700/115
(58) Field of Classification Search .................. 382/100, 382/110
See application file for complete search history.

(56) References Cited

U.S. PATENT DOCUMENTS

| | | | |
|---|---|---|---|
| 4,597,495 A | 7/1986 | Knosby | |
| 5,478,990 A * | 12/1995 | Montanari et al. | 235/375 |
| 5,793,879 A | 8/1998 | Benn et al. | |
| 6,104,966 A | 8/2000 | Haagensen | |
| 6,148,249 A | 11/2000 | Newman | |
| 6,231,435 B1 * | 5/2001 | Pilger | 452/157 |
| 6,267,661 B1 | 7/2001 | Melville | |
| 6,545,604 B1 | 4/2003 | Dando et al. | |
| 6,546,304 B2 | 4/2003 | Thorvaldsson et al. | |
| 6,600,829 B1 | 7/2003 | Affeldt et al. | |
| 6,859,672 B2 * | 2/2005 | Roberts et al. | 700/89 |
| 6,963,881 B2 * | 11/2005 | Pickett et al. | 1/1 |
| 6,975,233 B2 * | 12/2005 | Grose et al. | 340/573.1 |
| 2001/0005219 A1 | 6/2001 | Matsuo et al. | |
| 2003/0069772 A1 * | 4/2003 | Roberts et al. | 705/7 |
| 2004/0130620 A1 | 7/2004 | Buehler et al. | |
| 2005/0104958 A1 | 5/2005 | Egnal et al. | |
| 2005/0109443 A1 | 5/2005 | Sleiman et al. | |
| 2005/0154560 A1 * | 7/2005 | Fitzpatrick et al. | 702/182 |
| 2005/0180627 A1 | 8/2005 | Yang et al. | |

(Continued)

FOREIGN PATENT DOCUMENTS

EP 1 847 961 10/2007
WO WO 98/25211 6/1998

OTHER PUBLICATIONS

Guha et al., "Activity Discovery from Surveillance Videos," *2006 18th International Conference on Pattern Recognition IEEE Comput. Soc.*, pp. 1-4, Sep. 2006.

(Continued)

*Primary Examiner* — Hadi Akhavannik
(74) *Attorney, Agent, or Firm* — Alston & Bird LLP

(57) ABSTRACT

The invention provides a method and system having a computer system and imaging sensors that capture image data of an object, such as a carcass, as it moves through a processing facility and is converted into individual food products. The computer system analyzes the image data to produce a blob for the object being monitored. Source information that is referenced with the object being monitored can be associated with the object's blob. The blob can be used to track and identify the object, and to determine when one or more additional objects have been converted from the object being monitored. The computer system can create blobs for the additional objects and associate the referenced information with the new blobs. In one embodiment, the computer system is capable of continuously associating the source information for a particular source unit of food with converted food products that are converted from the source unit.

32 Claims, 10 Drawing Sheets

U.S. PATENT DOCUMENTS

2005/0186896 A1 8/2005 Nielsen
2005/0265582 A1* 12/2005 Buehler et al. ............ 382/103

OTHER PUBLICATIONS

Yordanov et al., "Identification and Traceability of Meat and Meat Products," *Biotechnology & Biotechnology Equipment*, vol. 20, No. 1, pp. 3-8, Feb. 2006.

Tonko et al., "Model-Based Stereo-Tracking of Non-Polyhedral Objects for Automatic Disassembly Experiments," *International Journal of Computer Vision*, vol. 37, No. 1, pp. 99-118, 2000.
European Search Report for EP 07023981.9 dated Apr. 21, 2008.
A Revolution in Traceability; retrieved from the website: FOODproductiondaily.com; Oct. 3, 2004; 1 page.

* cited by examiner

METHOD AND SYSTEM FOR ASSOCIATING SOURCE INFORMATION FOR A SOURCE UNIT WITH A PRODUCT CONVERTED THEREFROM

FIELD OF THE INVENTION

The invention relates generally to a method and system for converting a source unit into one or more converted products and more particularly to associating source information for the source unit with converted products converted therefrom.

BACKGROUND OF THE INVENTION

In many processing and manufacturing operations it may be desirable to associate a particular item or class of items with information that is unique to the item or to the class of items. Such information may include product identification, source, date manufactured or processed, and the like. For example, in many circumstances it may be desirable to maintain information regarding the source of each product and/or individual components of the product as well as various characteristics of the product that may be determined during processing.

Retention and associating such information may be particularly desirable in the food industry, where traceability and quality control may be important. For instance, in the meat processing industry it has become desirable to be able to track meat products such as primal cuts from the packaging of such primal cuts back to a carcass from which each primal cut was obtained. In some cases, it may be desirable to track the primal cuts to the lot of animals from which the carcass was obtained. Such tracking may permit a specific animal producer to be identified so that a specific food product may be linked to the animal from which it was derived.

The information may be recalled so that the food product may be tracked or traced to its origin. This may be useful, for example, in providing assurance to consumers or regulators that a product item, such as meat product, was actually derived from an animal source that was raised or processed under the stated conditions. For example, some consumers desire assurance that "organically grown" beef products were derived from cows that were actually raised by organic methods. Some regulators may want verification or certification that meat product items were derived from animals that were raised free from supplemental growth hormones, antibiotics, or biotechnological methods.

The ability to recall such information may also be useful to assure food safety and also to assist in product recall, if necessary. In some cases, information may permit tracing the destination of a suspect source of food or the origin of a suspect product item. Such traceability of food is increasingly important in view of harmful pathogens and viruses that have been associated with food product items derived from animal carcasses. For example, to minimize the effect of an outbreak of food poisoning caused by the presence of *e. Coli* bacteria in food product items, investigators seek to quickly determine the origin of the carcass from which the contaminated food product items were derived in order to effectively conduct product item recall. The same is true for cases of Bovine Spongiform Encephalopathy (BSE) (commonly known as "mad cow disease") and other contaminations.

In meat processing facilities it can be difficult to identify the actual source (e.g., the specific animals or animal carcasses) from which a particular food product, such as a consumer retail cut of meat, was derived. This difficulty is due, at least in part, because of the complexity and size of modern meat processing operations. For example, in many meat processing facilities a carcass is moved into a de-boning room where it is sectioned into primal cuts (e.g., hindquarter or forequarter). Each of the primal cuts may then be processed by multiple individuals that section and cut the carcass into increasingly smaller cuts. During such processing, the meat cuts may be moved between various work stations at which a worker performs a specific cut on each piece of meat in an assembly line-like process. Generally, the processing operations move at a high rate of speed so that a relatively large volume of meat cuts can be processed. As a result, meat cuts from multiple animals may be intermingled, thus making it difficult and expensive to tag or label each cut so that it can be traced to the source carcass from which it was derived.

Additionally, the processing facility may include conveyor belts that are used to move the meat cuts throughout the processing facility and between subsequent work stations. This can further increase the difficulty in tracking the meat cut to the source carcass from which it was derived. For instance, as the meat cut travels past a worker, the worker will have to quickly reach and pull pieces of meat off the conveyor. The worker will then section the meat cut into smaller meat cuts that are then placed back onto the conveyor where they are transported downstream for further processing. In some cases, the work may stack multiple meat cuts upon one another. As a result, meat cuts are being removed, cut, and redeposited onto the conveyor belt at a relatively high rate of speed, which further enhances the difficulties of linking a particular food product with information that is specific to the carcass from which it was derived.

Thus, there exists a need for a system and method that can be used to link a particular food product item with information that is referenced to the animal or original non-portioned food product from which the food product item was derived.

BRIEF SUMMARY

In one embodiment, the present invention is directed to a method and system having one or more imaging sensors that capture image data of an object, such as a carcass, as the object moves through a processing facility and is converted into individual converted products. In one embodiment, the system includes a computer system having various program modules, algorithms, rules, and combinations thereof that analyze the image data to produce a blob for the object being monitored by the computer system. The computer system can associate information that is referenced to a particular object being monitored, such as the source of the object, with the blob created for the object. The computer system may use the blob to track and identify objects within the processing facility and may incorporate vision tracking of associated machines to allow for tracking of the object in the processing facility.

In one embodiment, the computer system is configured to analyze the image data of a source unit and determine if the source unit has been converted into one or more converted products, for example when a source unit of food is converted into one or more converted food products. Upon making such a determination, the computer system can associate the source information for the source unit with blobs for the converted products. In some embodiments, the computer system is capable of continuously associating the source information for a particular source unit with converted products that are converted from the source unit. As a result, the invention helps provide an efficient and cost effective method of associating source information for a particular source unit with one or more converted products.

In one embodiment, the object being monitored can also be assigned an identification code that can be associated with the source information and the blob. The identification code may then be used to recall the source information regarding the object. In some embodiments, a representation of the identification code can be labeled or encoded onto the packaging in which the object has been packaged. The representation of the identification code can be inputted into a computer system from which the source information may be recalled.

BRIEF DESCRIPTION OF THE SEVERAL VIEWS OF THE DRAWING(S)

Having thus described one or more embodiments of the invention in general terms, reference will now be made to the accompanying drawings, which are not necessarily drawn to scale, and wherein:

Figure 8A:
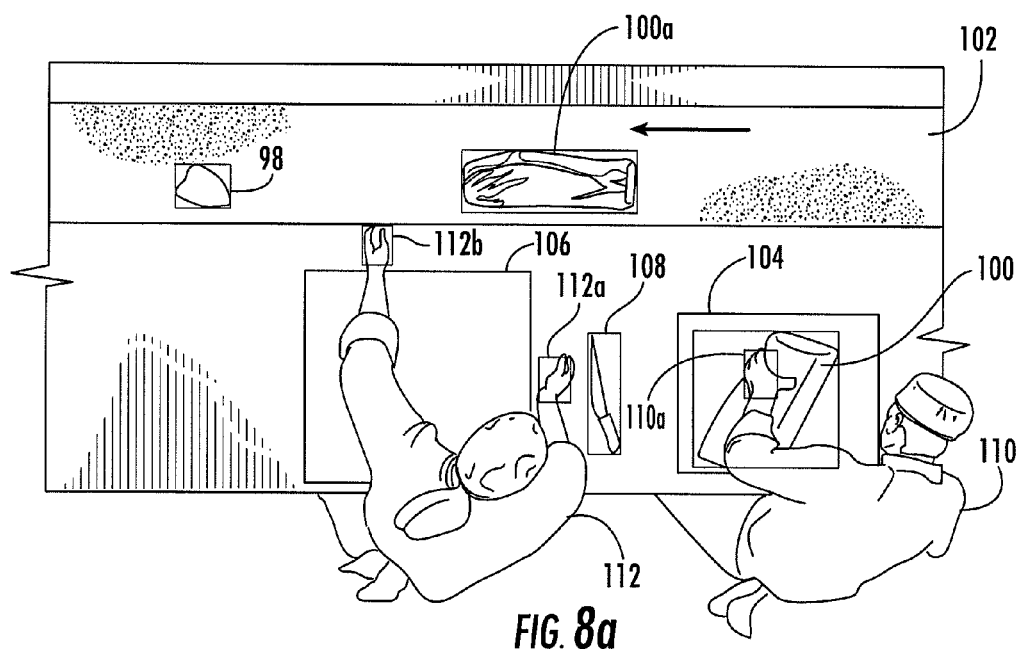
Figure 8B:
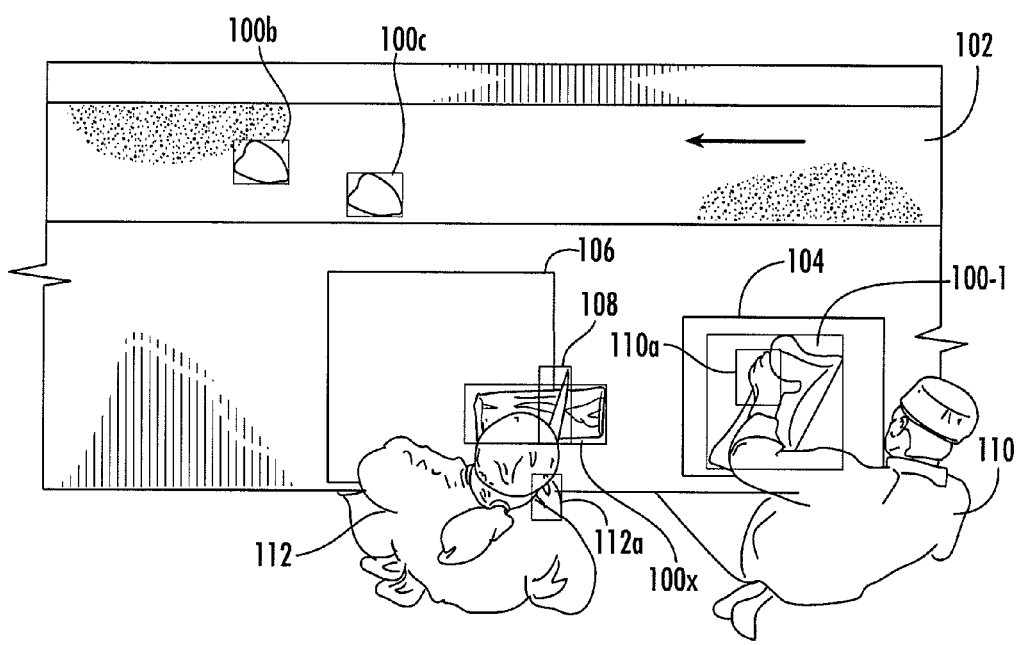
Figure 8C:
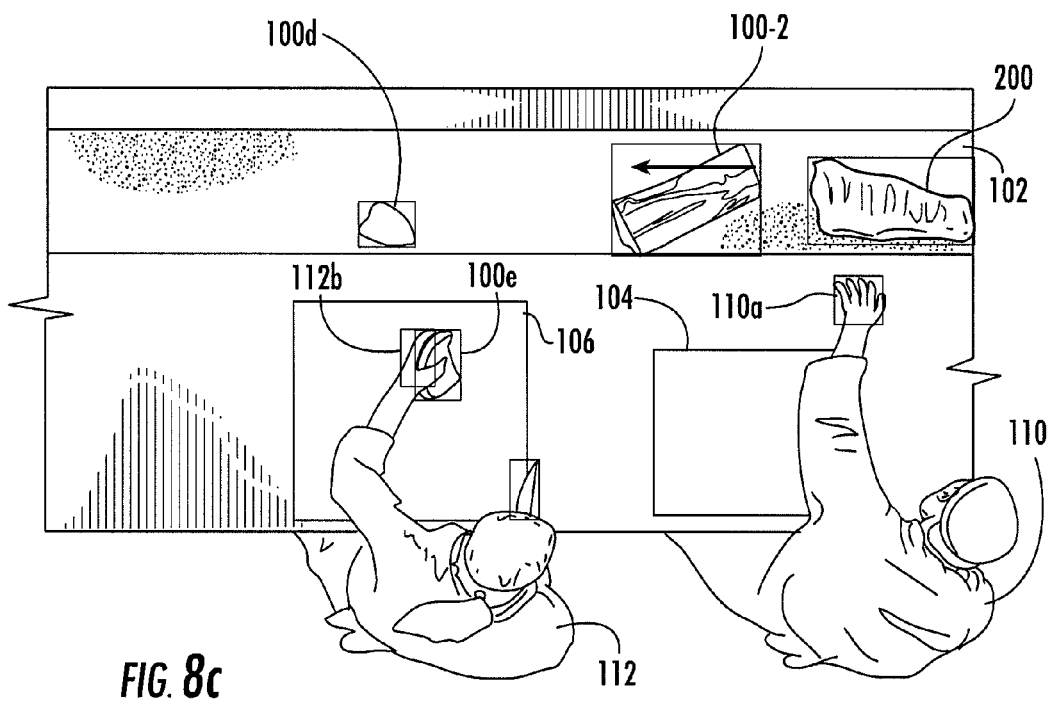
Figure 9:
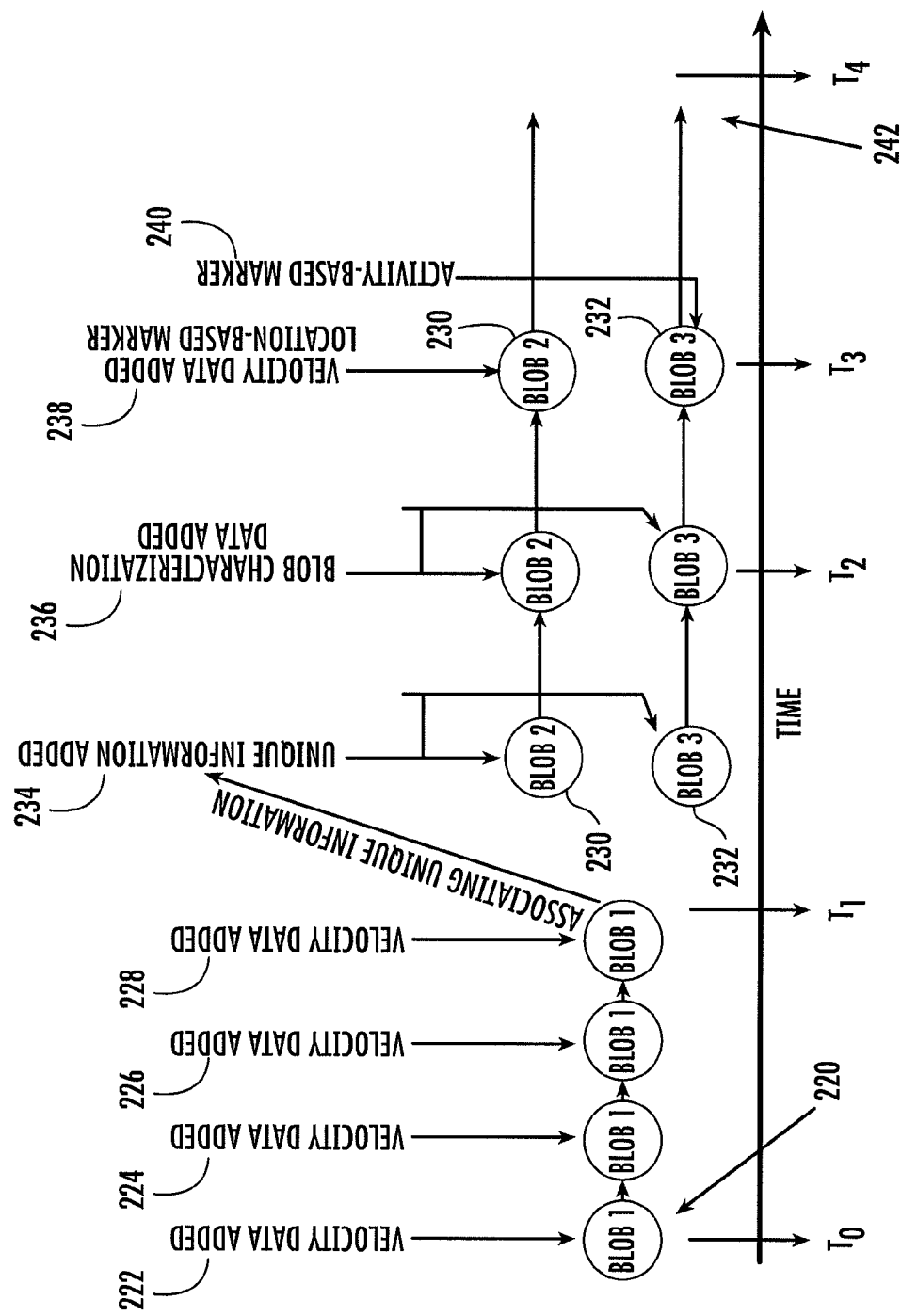

FIGS. 8a through 8c are representations of image data that have been captured by imaging sensors that are positioned above two work stations and that illustrate the creation of blobs for converted product meat cuts that have been converted from a source unit of food; and FIG. 9 is a representative schematic of a system having various sensors for tracking and identifying an object, such as a meat cut, as it moves through the processing facility.

DETAILED DESCRIPTION

One or more embodiments of the present invention now will be described more fully hereinafter with reference to the accompanying drawings, in which some, but not all embodiments of the invention are shown. Indeed, the invention may be embodied in many different forms and should not be construed as limited to the embodiments set forth herein; rather, these embodiments are provided so that this disclosure will satisfy applicable legal requirements. Like numbers refer to like elements throughout.

Figure 1:
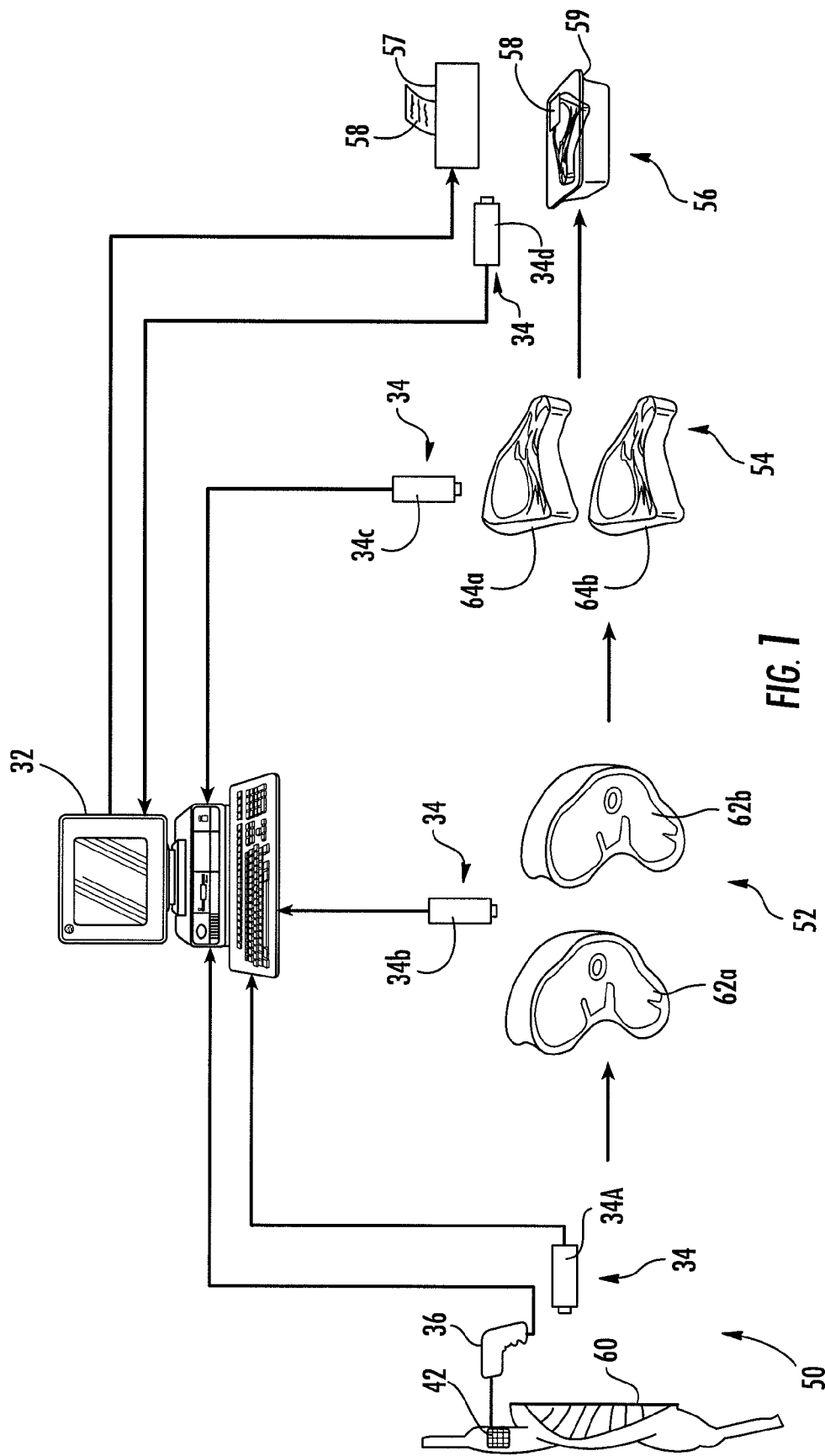
FIG. 1 is a representative schematic of a system and method that can be used to track and identify objects in a processing facility.

FIG. 1 illustrates a method and system for tracking a source unit, such as a carcass of an animal, through a processing facility as the source unit is converted into individual converted products. In one embodiment, the system includes a computer system 32 having one or more imaging sensors 34 that capture image data of the source unit and image data of converted products. In one embodiment, the imaging sensors can continuously capture image data of the source unit and any converted products as they move throughout the processing facility. As discussed in greater detail below, the computer system includes computer-readable program code that is used by the computer system to analyze the image data and produce a blob for the object being monitored. The computer system can associate source information that is referenced to a particular object being monitored with the blob created for the object. The computer system may also use the blob to track and identify the object within the processing facility.

In one embodiment, the computer system is configured to analyze the image data and determine when one or more new objects have been converted from the object being monitored, for example when a source unit of food has been converted into one or more converted food products. The computer system creates one or more blobs for the new objects and associates the source information with the thus created one or more blobs. In one embodiment, the computer system is capable of continuously associating the source information for a particular source unit with converted products. As a result, the invention helps provide an efficient and cost effective method of associating source information for a particular source unit with converted products that are converted from the source unit.

In some embodiments, the resulting packaged converted products can also be labeled or encoded with an identification code that permits the source information to be recalled from the computer system. Although the embodiment illustrated in FIG. 1 is directed to a processing facility for the conversion of an animal carcass 60 into converted product meat cuts, (e.g., 62a, 62b, 64a, 64b), it should be recognized that the system and method can be used in the processing of a wide variety of different objects. FIG. 1 is discussed in greater detail below.

Conversion Processes

A typical conversion process may produce a plurality of food products from a single source unit or from a plurality of source units. Examples of source units of food include live or dead animals (e.g., cattle, sheep, pigs, chicken), plants (e.g., corn), and partially processed objects such as carcasses, primal cuts, section cuts, and grain. Thus, a source unit may be an object from an animal (e.g., a primal cut). Examples of conversion processes include meat processing (e.g., cattle or swine processing) and meat packing processes, such as those described in U.S. Pat. No. 6,104,966 issued Aug. 15, 2000 entitled "Primal Tracking," which is incorporated herein in its entirety by reference. Examples of converted food products include objects converted from animals, including the fully converted products produced for retail sale, such as ground hamburger, sausage, and retail meat cuts, as well as intermediate objects such as primal cuts and sub-primal cuts.

A source unit of food is generally upstream from its corresponding food product in a given conversion process. A converted food product may comprise at least a portion of one or more source units. Further, one or more converted food products may comprise at least a portion of, and even all of, a source unit. A converted product may comprise two or more source units, for example, where a first source unit comprising a first converted food product is placed on a source unit comprising a packaging tray to create a second converted food product comprising the first convert food product and the packaging tray, or when multiple converted products from different source units are combined in a single package.

Depending on the extent of the conversion process under consideration, a source unit of food may be an object other than the earliest starting material for producing a converted food product—and a converted food product may be an object other than the ultimate material used by the consumer. For example, if the extent of a given conversion process is defined as turning live cattle into the retail meat cuts derived from the cattle, then the source units of food are the cattle and the converted food products are the retail meat cuts that are converted from the cattle. However, if the extent of the conversion process is defined as the butchering of primal cuts of beef into sub-primal cuts of beef, then the primal cuts are the source units of food and the sub-primal cuts are the converted food products. In some embodiments, a source unit may be converted into one or more intermediate converted products before being converted into a final converted product. For example, a source unit of food may comprise a source unit, such as cattle, which is subsequently converted into a first and second intermediate converted food product (e.g., primal and subprimal cuts) before being converted into a final converted food product, such as a retail cut.

Figure 2:
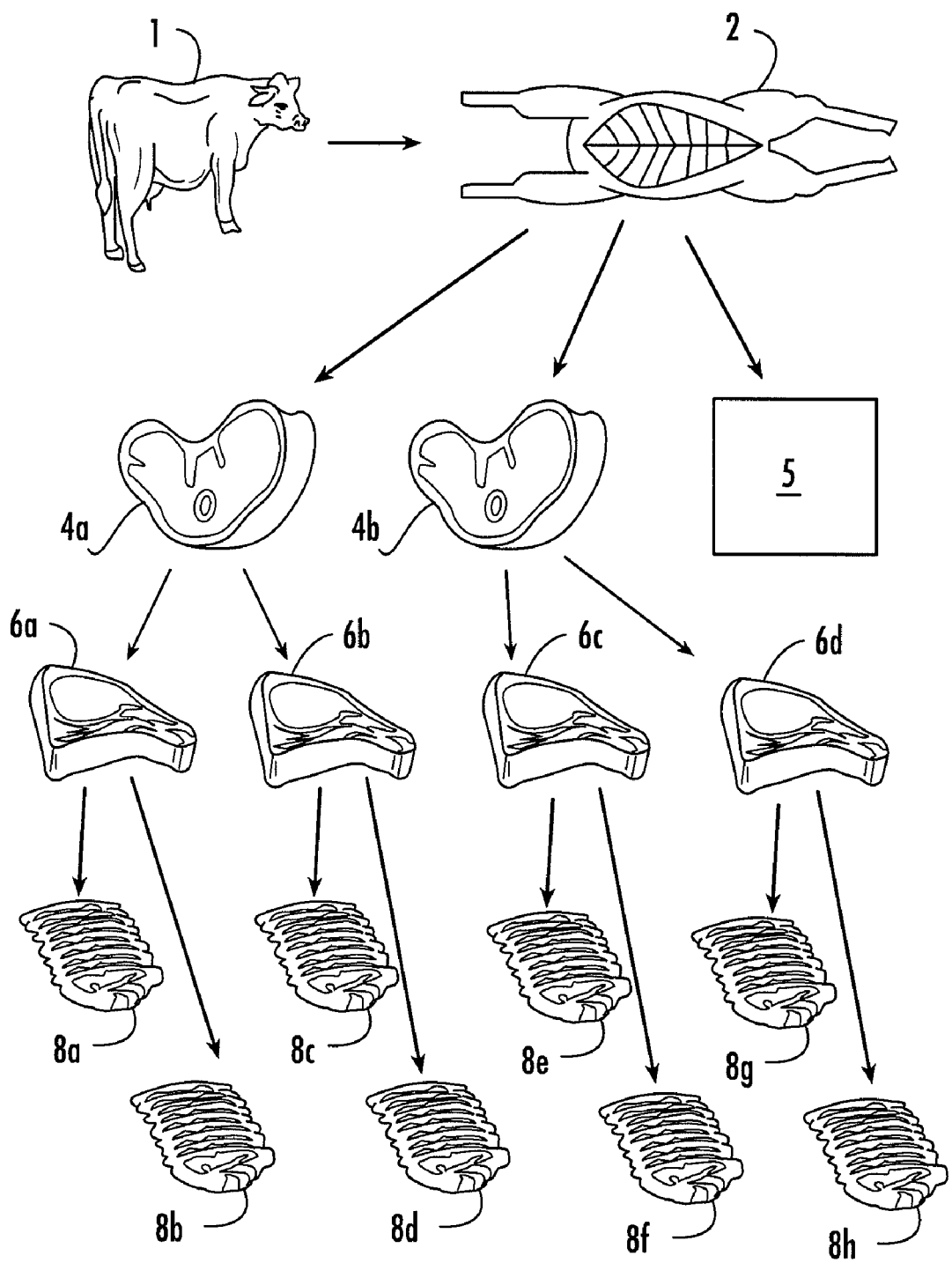
FIG. 2 is a representation of a meat processing conversion process.

In a meat conversion process represented by FIG. 2, a cow 1 is slaughtered to render a carcass 2, which is cut to render primal cuts 4a-b and other materials 5 (e.g., the rest of the carcass not comprising the primal cuts). The primal cuts are butchered to render sub-primal cuts 6a-d, which are subsequently processed into retail cuts 8a-h. In this representation, the cow 1 may be considered a source unit of food and the retail cuts 8a-h as final converted food products of food that are converted from the cow 1 source unit. However, if the conversion process under consideration is more focused, then the intermediate objects 2, 4a-b, and 6a-d may be classified as either as source units or as intermediate converted food products depending on the segment of the conversion process being analyzed. For example, if the conversion process is from primal to sub-primal, then primal cuts 4a-b may be classified as source units for the sub-primal cuts 6a-d, which may be considered the converted food products converted from the primal cut source units. Further, a converted food product comprising ground hamburger (not shown) may contain a mixture of meat converted from one or more cows as source units.

Figure 3:
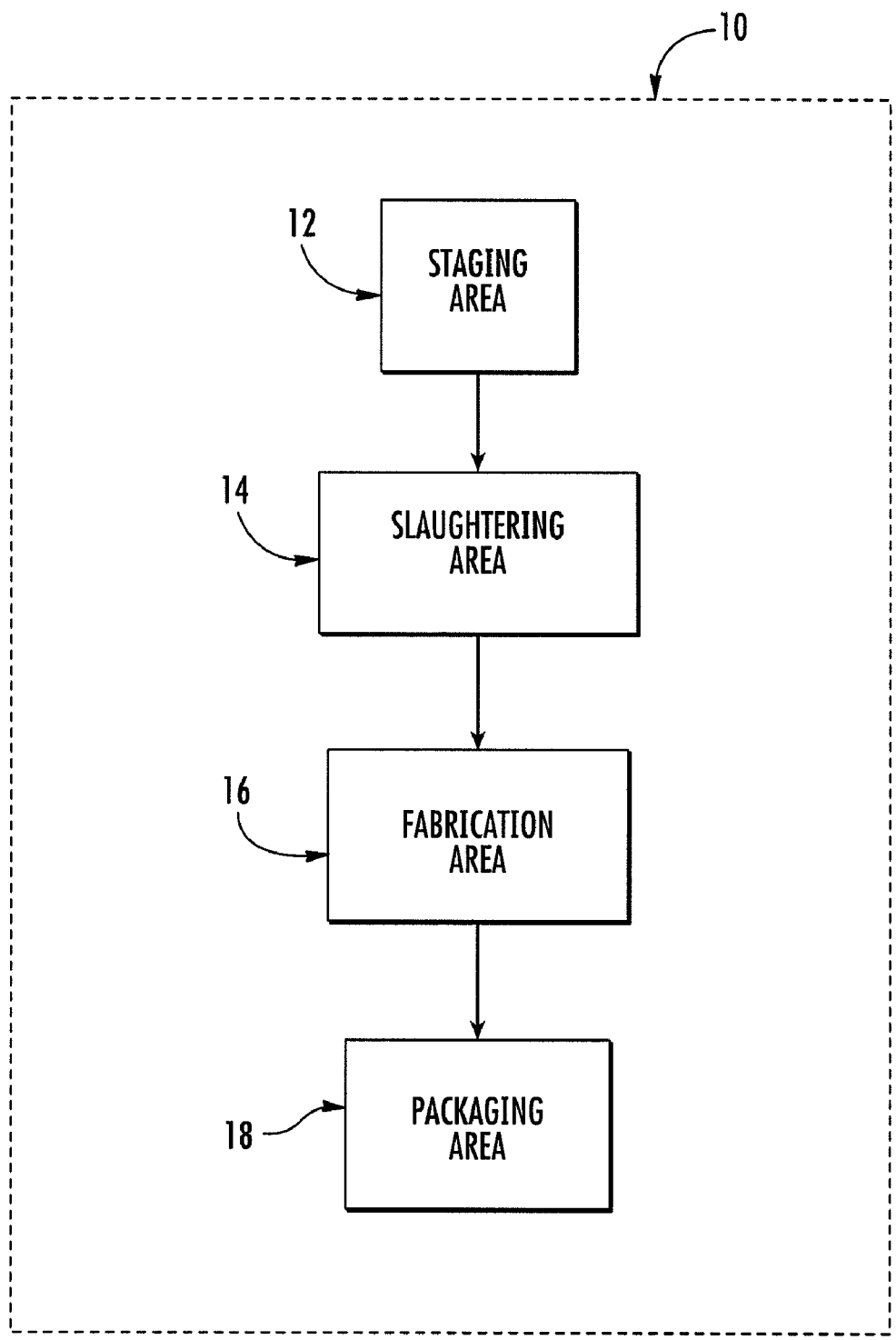
FIG. 3 is a representative schematic of a meat processing facility.

FIG. 3 shows a schematic of a typical meat processing facility 10 that may be used in the conversion of source units of food into individual converted food products. Animals, such as cows, enter staging area 12. Staging area 12 may be used to read and record source information regarding an animal, such as the weight of the animal and the identity of the producer from which the animal was obtained. Next, the animal enters a slaughter area 14, where the animals are slaughtered and converted into carcasses, which are then divided into carcass sections (e.g., halves, quarters, or primal cuts). Source information regarding a carcass or carcass sections (e.g., the weight, fat content, and yield grade) may be read and recorded at slaughter area 14.

At fabrication area 16, the carcass sections are cut and processed into sub-primal cuts and perhaps retail cuts on the cutting floor. Finally, in packaging area 18, the sub-primal and/or retail cuts are packaged and shipped to customers. If shipped as sub-primal cuts, then the sub-primals may be subsequently unpackaged, cut into retail cuts, and re-packaged at the retail location (not shown) or elsewhere.

By the time a source unit of meat arrives at the fabrication area from the slaughter area, source information may be associated with it. The source information of the source unit may take the form of symbolic, alpha, or numeric information embodied in or on a machine- or human-readable identifier, such as a tag or label (e.g., bar coded tag or label), hole pattern, or radio frequency identification ("RFID") transponder attached to the source unit. The identifier may have been attached to the source unit upstream of staging area 12, or may be attached while the source unit is at the staging or slaughtering areas 12 and 14. RFID tags are useful in that they may facilitate access of previously recorded information regarding the source unit. As an alternative to direct attachment to the source unit, the identifier may be attached to a transportation device associated with the source unit. For example, an identifier may be attached to the trolley or hooks used to transport carcass halves on a rail to the fabrication area 16. Further, separate identifiers may be attached to both the source unit and the transportation device. In one embodiment, the source unit may include an identifier that is in the form of a representation of an identification code that may be attached or associated with the animal carcass. The representation of the identification code permits data representing the identification code to be inputted into a data system (e.g., a computer system). The data system may use the identification code to recall source information that is referenced to a particular source unit of food source. Information that is referenced with a particular source unit of food may include information that is unique to the source unit of food. In the context of meat packaging, this so-called "source information" may include data that permits traceability of a meat product back to its source. Such data may include, for example, source animal, type of cut, weight, date slaughtered, date packaged, age of the animal, diet of the animal, lineage of the animal, etc. In some embodiments, the source information may also include information that is not unique/specific to the source unit, such as type of cut, processing facility, and the like.

As discussed in greater detail below, the method and system uses one or more imaging sensors that capture image data for an object, such as a source unit of food and/or converted food products that are converted therefrom, during the conversion process. The image data is analyzed with a computer having computer-readable program code stored thereon that analyzes the captured image data and creates a blob of the object. The blob can be used to identify and track objects, such as a source unit of food and/or converted food products, as they move through the processing facility.

A blob is based on geometric and spatial characteristics of the object being imaged that is generally unique to the object being monitored and can be used to uniquely define the object. A blob for an object being monitored can be created using blob analysis in which a computer system analyzes image data of the object being monitored to create a blob for the object. Methods of creating blobs and performing blob analysis are generally known to those of ordinary skill in the art. The blob analysis can be performed using various known methods for performing blob analysis including, background subtraction techniques, Harris corner techniques, Canny images, edge analysis techniques, color imaging, and other special relationships, and combinations thereof. In one embodiment, the blob analysis comprises creating a 2-D coordinate system, such as rectangle, about the image of the object. The spatial relationship of the object within the coordinate system is unique to the object and can be used to identify an object in a video image or an individual frame of a video image, and can also be used to track the movements of the object.

Blobs can comprise both stationary and moving objects. The computer can associate source information that is referenced to the source unit of food with the blob for an object being monitored. In subsequent conversion processes, image data can be captured and analyzed to create additional blobs for the source unit of food and any converted food products (e.g., primal, subprimal, or retail cuts) that are converted from the source unit of food. These additional blobs can also be associated with the source information that is referenced to the source unit of food from which they were converted. As a result, the source information referenced to the source unit of food can be continually associated with the converted food products. In some embodiments, the associating of the source information with the blob(s) can be done in real time. The source information can be encoded or printed directly onto the packaging in which the converted food products are packaged. Additionally, the converted food products can be associated with an identification code or number that permits the source information to be recalled from a computer or database.

Figure 4:
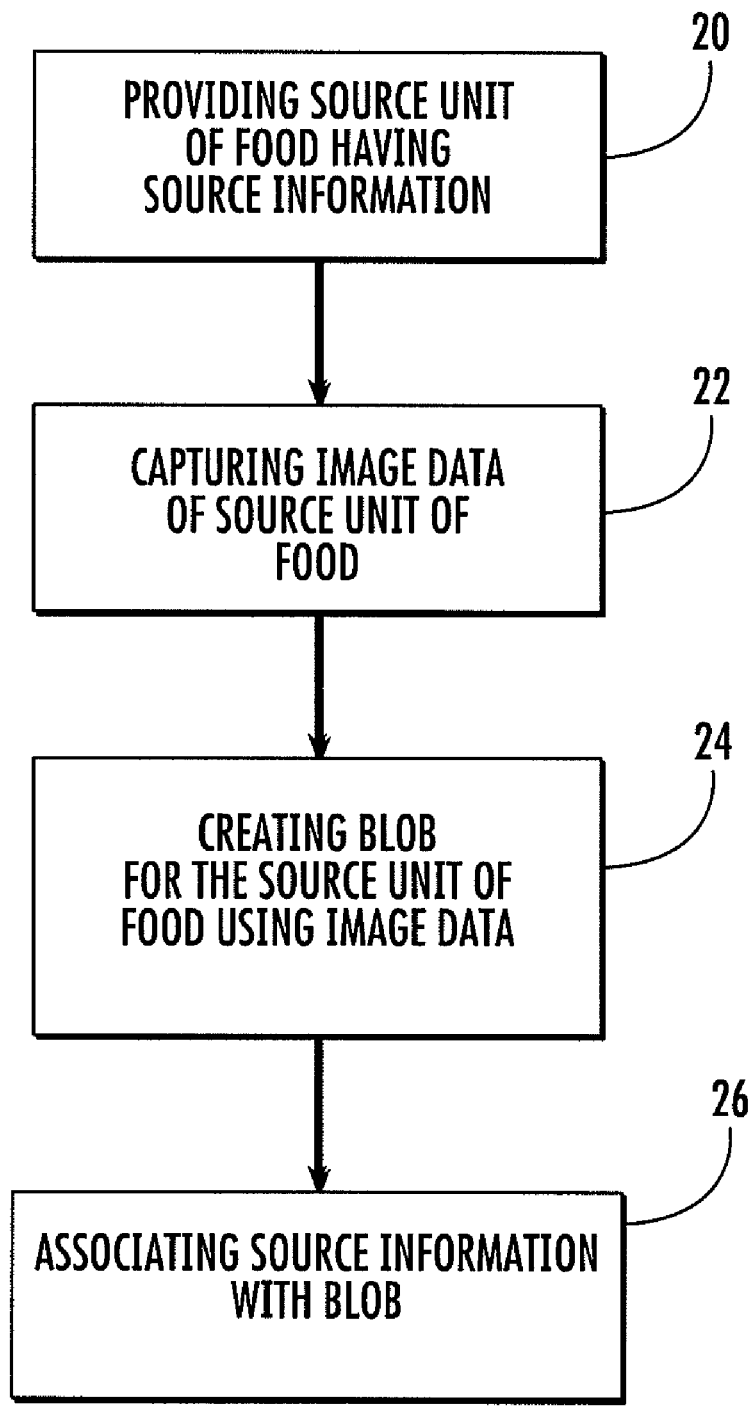
FIG. 4 is a representative flow chart of a process for associating source information for a source unit with a blob for the source unit.

FIG. 4, is a flow chart representing an exemplary method of associating source information referenced to a first object, such as a source unit of food, with one or more objects that are converted from the first object, such as converted products such as converted food products (e.g., primal cuts, sub primal cuts, or retail cuts). At step 20, source unit, such as a primal cut, is provided. The source unit is provided with source information that is referenced to the source unit. An operator upon receiving the source unit can enter the source information into a computer system or alternatively may recall the source information from the computer system. An imaging sensor captures image data of the source unit at step 22. At step 24, the image data is communicated to a computer system having various computer-readable program codes that analyze the image data and create a blob for the source unit. In some embodiments, the steps of capturing the image data and creating the blob for the source unit can occur substantially simultaneously or comprise a single step. For example, in some systems, capturing of the image data may also result in the creation of a blob for the source unit. The computer can then associate the source information for the source unit with the blob of the source unit at step 26. The blob, which is associated with the source information, can be used to identify the source unit and associate the source information with converted products that are converted from the original source unit and any intermediate converted products that are created during processing.

Vision-Based System

Figure 5:
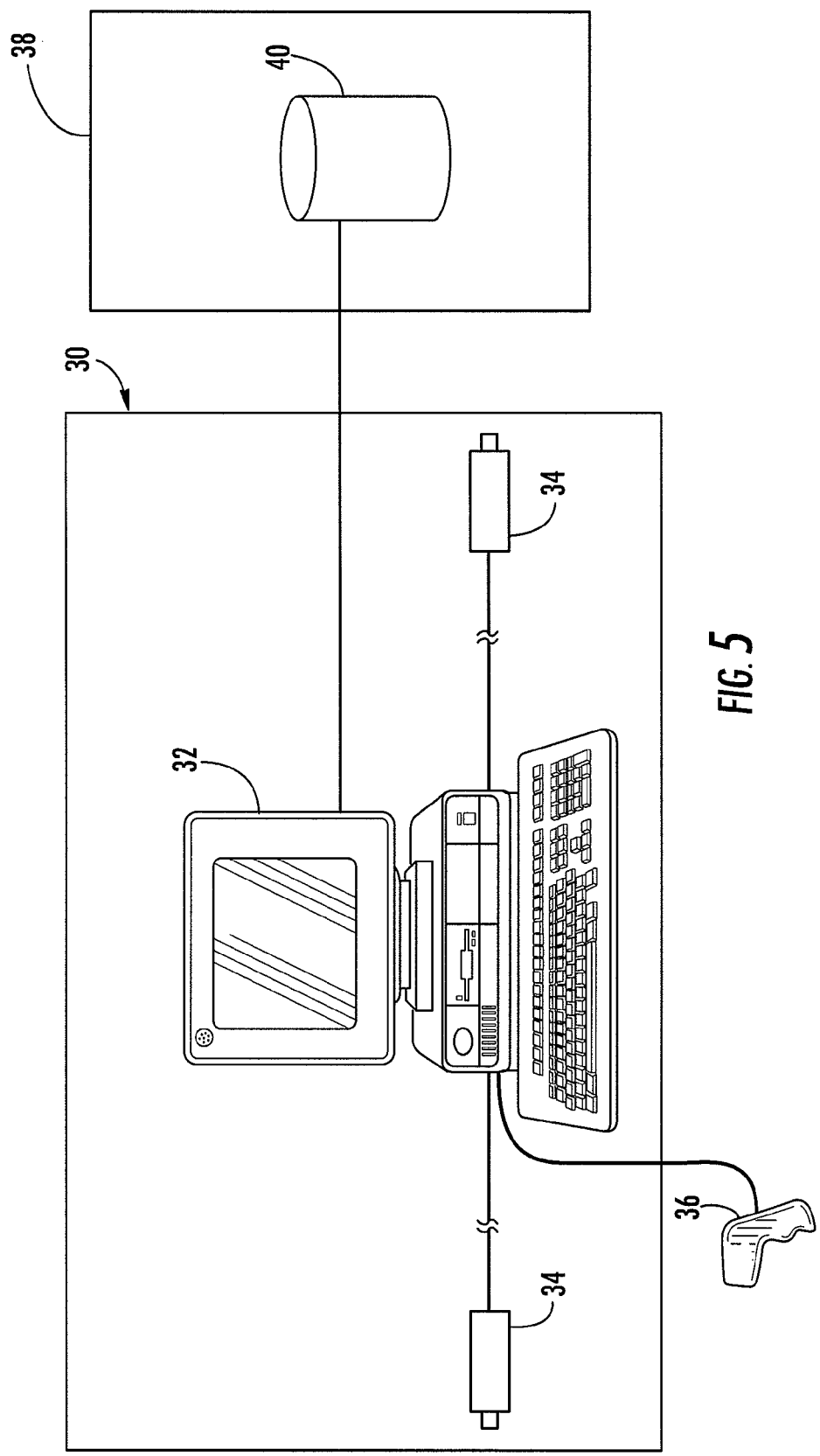
FIG. 5 is a representative illustration of a computer system that can be used for tracking and identifying objects in the processing facility.

In one embodiment, the present invention provides a vision-based system having one or more imaging sensors that are in communication with one or more computers. In this regard, FIG. 5 depicts an exemplary system 30 according to one embodiment of the present invention. The system 30 may include a computer system 32 that receives and processes image data from one or more imaging sensors 34. The image sensors are configured and arranged to capture image data of a plurality of objects within the processing facility. Although only two sensors are depicted in FIG. 5, it should be recognized that the system may include many more imaging sensors that capture data at various locations throughout the facility.

The imaging sensors are positioned and arranged to capture image data of objects and activities in the processing facility, such as processing lines and interactions between source units and/or converted products being monitored and the surrounding environment. Imaging sensors that may be used in the invention include analog video cameras, digital video cameras, color and monochrome cameras, closed-circuit television (CCTV) cameras, charge-coupled device (CCD) sensors, complementary metal oxide semiconductor (CMOS) sensors, analog and digital cameras, PC cameras, web cameras, and infra-red imaging devices, or any device that can capture image data. The selection of a particular camera type for a particular facility may be based on many factors including environmental lighting conditions, the frame rate and data acquisition rate, and the ability to process data from the lens of the camera within the electronic circuitry of the camera control board, the size of the camera and associated electronics, the ease with which a camera can be mounted as well as powered, the lens attributes which are required based on the physical layout of the facility and the relative position of the camera to the objects, as well as the cost of the camera. Examplary cameras that may be used in the practice of the invention are available from Sony such as Sony Handycam Camcorder model number DCR-SR80.

The computer analyzes the image data and creates a blob for one or more objects in the image data. In one embodiment, the computer includes computer-readable program codes that are capable of performing blob analysis of the image data to create a blob that can be used to track and identify the object for which the blob has been created. Computer-readable program codes include program modules, algorithms, rules, and combinations thereof. The computer-readable program code may be in the form of software, hardware, and combinations thereof.

Blobs can be created and blob analysis may be used for objects being converted, such as source units or converted products, as well as for converting items that may be encountered in the processing facility. Generally, a converting item may include an item that interacts with a source unit and/or converted product in the conversion of a source unit into a converted product. For example, in the case of a meat processing facility, blobs can be created for converting items such as knives, saws, personnel, hands, gloves, hooks, work stations, cutting boards, conveyor belts, carts, bins, packaging materials, such as bags or boxes, and the like.

The computer system may also include computer-readable program codes that process the image data of objects being monitored to perform one or more of the following functions: identifying an object being monitored; performing blob analysis; tracking of an object as it moves through the processing facility; locating an object in the processing facility; associating source information with an object; and determining if an object has been converted into additional objects (e.g., converting a source unit into one or more converted products). The computer-readable program codes may include program modules, various algorithms, rules, and combinations thereof that facilitate the performance of their respective functions.

In one embodiment the computer-readable program code includes a plurality of executable portions that are capable of performing one or more of the following: analyzing image data and/or creating a blob for a source unit; associating source information that is referenced to the source unit or a converted product with the blob; determining if one or more converted products have been converted from the source unit or intermediate converted products; analyzing image data and creating a blob for converted products converted from a source unit; and associating the source information for the source unit with the blob(s) that were created of the converted products. In some embodiments, the computer code may also include executable portions for tracking the movements of the source units and/or converted products converted therefrom through the processing facility; executable portions for recognizing a conversion activity that converts a source unit, intermediate converted product, and/or a final converted product, or a combination thereof, executable portions for analyzing and recognizing a converting item in image data captured by the plurality of imaging sensors and whether the converting item interacts with a source unit, an intermediate converted product, and/or a final converted product or a combination thereof, and an executable portion for analyzing image data to determine if a source unit, intermediate converted product, and/or a final converted product or combination thereof is at a conversion zone where a conversion activity has occurred or is likely to occur.

As shown in FIG. 5, the system may also include a data entry device 36 that can be used to input information that is specific to the source unit into the computer system 32. In one embodiment, the data entry device may comprise a keyboard for manually entering the source information into the computer system, for example, at the start of the conversion process. In some embodiments, the data entry device may comprise an RFID reader, bar code reader, or similar device that is able to communicate with an RFID tag or read a bar code. The data entry device may be capable of reading and inputting a representation of an identification code that is associated with a specific source unit of food into the computer system. The computer system may associate blobs for a source unit and converted products with the identification code.

The system may also include a memory storage device that may be an integral or external component of the computer system, a database, or both. The memory storage device can be configured to store the computer-readable program codes that are used to perform the blob analysis, identification analysis, tracking analysis, and the like. The memory storage device can also be used to store source information that is referenced to the source unit, one or more blobs created for various items, such as converting items, in the processing facility, blobs for objects being monitored, such as source units and converted products, that are being processed or have been processed, associative relationships between blobs, and the like.

In one embodiment, the computer system 32 may be in communication with an external system 38 having database 40. In this embodiment, information can be stored in database 40 and recalled as needed. In some embodiments, the system may comprise part of a networked system in which the system is connected to one or more of other processing facilities, external databases and computer systems, supply and distribution centers, retailers, suppliers, such as ranchers, regulating authorities, and the like. In one embodiment, the system can be connected to various other system via a network connection, such as the internet The system 30 may also include physical information sensors that can be used to obtain information other than visual information regarding the objects (e.g., source units/converted products) being monitored or the environment in which the object is located. Physical information obtained from these sensors can be associated with the blob corresponding to the monitored object to further characterize the object. Such sensors may include devices for weighing the source units/food products, motion detectors, conveyor speed sensors, various switches, and the like. For example, further characterization of the object being monitored can be performed using physical parameters of the object such as weight, color, texture, temperature characteristics, and the like. The system may also include physical information sensors for monitoring conditions in the conversion environment, such as temperature, humidity, etc. The computer system may be in wired or wireless communication with the various sensors, data entry device(s), database(s), and any additional devices.

Monitoring of the Conversion Process

As discussed above, the invention also provides a system and method that can be used to monitor objects during the conversion process. Referring back to FIG. 1, a schematic diagram of a system and method for monitoring a source unit of food as it moves through the processing facility is illustrated. At the beginning of the conversion process, image data of a source unit of food 60 is captured at starting point 50. The source unit of food 60 may include a representation of an identification code 42 that can be used to recall source information that is referenced to the source unit of food, such as a barcode or RIFD tag. A worker may then enter the identification code into the computer system using a data entry device 36, such as keyboard, bar code reader, RFID reader, or the like. Alternatively, a worker may manually enter the source information for the source unit of food into the computer system. For example, in one embodiment, source information that is referenced to a source unit of food, such as identifying information, may be entered into the computer system in conjunction with creating a blob of the source unit of food. As a result, the source information can be associated with the source unit of food without having to physically apply a source indicia, such as a tag or label, to a source unit of food or its carrier, such as a hook, trolley, cart, or the like.

Imaging device 34a captures image data of the source unit 60, which is communicated to the computer system 32. The computer system processes the image data of source unit 60 to create a blob of the source unit of food. The blob is then associated with the source information for the source unit of food in the computer system. In one embodiment, the blob may be associated with an identification code for the source unit. In some embodiments, additional information regarding the source unit and/or converted food product may be associated with the blob(s) and/or the identification code(s), such as date and time of conversion, worker identification, plant location, work station, weight, etc. Such additional information may be used to track quality control and worker productivity.

In subsequent operations, the source unit of food may be converted into individual converted food products at various work stations 52, 54. As shown, imaging sensors 34b, 34c capture image data of the source unit as it is converted into converted food products 62a, 62b and 64a, 64b, respectively. Although FIG. 1 illustrates two work stations, it should be understood that the conversion process may include as little as one work station or many more work stations.

The computer system analyzes the captured image data during the conversion of the source unit and creates additional blobs for the source unit as it is converted. These additional blobs can also be associated with the source information that is referenced to the source unit. As discussed in greater detail below, the computer system can include program modules and algorithms that process the image data and determine if converted food products have been converted from the source unit (e.g., has the source unit or an intermediate food product been converted into one or more converted food products). Such determinations can occur over time intervals ranging from milliseconds to days. For example, from about 1 millisecond to 1 minute, and in particular between 1 millisecond to about 1 second. Upon determining that converted food products have been converted from the source unit, the computer system can create blobs for each of the thus-created converted food products (e.g., converted food products 62a, 62b, 64a, and 64b). The source information referenced to the source unit can also be associated with these new blob images, and hence the converted food products which are represented by the blobs. Information generated in each step of the conversion process can also be associated with the blob, and hence the food products. The conversion process can be repeated n number of times to create converted products, for example intermediate and final food products, having blobs that are associated with source information that is referenced to the source unit 60 or any intermediate converted food products from which they have been converted.

Tracking individual blobs, and hence the food product corresponding to the blob, permits the source information for the converted food product being monitored to be recalled and utilized. In one embodiment, this can be accomplished using program modules that track the position of the converted food product as it moves through the processing facility, and as a result of these movements and the position of the converted food product, instruct various devices to perform one or more predetermined activities. For example, in one embodiment the computer system can be configured to track the converted food product as it approaches or arrives into a packaging area. In response, the computer system can instruct a device, such as a printer or RF transceiver, to encode or print a representation of an identification code onto a label. After the converted food product has been packaged, the label can be attached to the container containing the converted food product. The source information that is referenced to the packaged converted food product may be recalled from the computer system or a database by inputting the representation of the identification code into a computer that is capable of being in communication with the computer system in which the information is stored.

As shown in FIG. 1, imaging sensor 34d can be used to track the movements of a converted food product as it approaches or is located at the packaging area 56. The computer system may instruct a printer 57 or RF transceiver to print or encode an identification code onto a label 58 that can be attached to the packaged converted food product 59. The representation of the identification code on the label can be used to recall the source information that has been associated with the packaged converted food product. In some embodiments, the source information can be printed or encoded directly onto the label.

In one embodiment, the system can also be operatively connected with one or more automated and/or robotic systems in the processing facility. For example, in one embodiment, the system may include a coordinate system that can be used to identify the location of an object being monitored or the velocity profile associated with the object as it moves through the processing facility. The computer may then instruct one or more automated/robotic systems to perform one or more actions on the object, such as packaging, printing a label, relocating the object, treating the object, and the like. In some embodiments, the automated/robotic system may comprise a box loader, a stacker, a cutting knife, a conveyor belt, a cart, etc., that can be automated to perform one or more actions on the object. The system may actuate things like horns or solenoids, for example, to indicate that a particular area or bin is full and needs to be emptied or removed for further processing. In a further embodiment, the automated/robotic system may comprise a robot and/or pneumatic, electric, mechanical, or hydraulic system that is in communication with the computer and is capable of physically interacting with one or more of the objects being monitored.

Recognition and Creation of Additional Blobs

As discussed above, the computer system may include computer-readable program code that is configured to analyze image data of the object being processed and determine whether the object has undergone a conversion. If the computer-readable program code determines that the object has been converted, the computer-readable program code can be configured to automatically associate the source information with the new blob for the converted object. For example, if a portion of a source unit is removed, such as a retail cut or piece of fat, the source unit has been converted into a converted product. The computer system analyzes the image data and create new blob(s) for the one or more converted products and automatically associate the new blob with the source information that is referenced to the source unit.

In one embodiment, the computer-readable program code may comprise a program product on which the program code and various program modules and executable portions of the program code, can be stored and recalled. In some embodiments, the program product can be used in conjunction with an existing computer system.

In some embodiments, each subsequent blob can also be associated with the preceding blob to thereby create a chain linking subsequent food products to the original source unit from which they were converted. In one embodiment, this can be accomplished by creating a parent-child relationship between the subsequent blobs. These parent-child relationships can be stored in the computer system or an associated database to thereby provide an ancestral chain linking the final converted food products and intermediate converted food products to the source unit from which they were converted.

In some embodiments, the computer-readable program code can be configured to create a new blob based on the occurrence of a conversion activity that converts the monitored object into a converted product. In some embodiments, a conversion activity may result in the image data of the object having a different size, shape, and/or appearance. In one embodiment, the computer system may include program modules that process image data of the object for the occurrence of one or more conversion activities. In one embodiment, conversion activities may include the interaction of a converting item with an object (e.g., source unit or a previously converted product). In one embodiment, the computer system includes an Activity Recognition Module (ARM) that processes the image data for the occurrence of a conversion activity. The recognition of a conversion activity may be based on the location of the object in the processing facility, the interaction of an object being monitored with a converting item in the processing facility, the trajectory and velocity of an object within the processing facility, and composites of these activities. For example, the interaction of a cutting instrument with the object (e.g., a meat cut) being monitored may result in recognition on the part of the computer system that a conversion activity may have occurred. Upon making a determination that a conversion activity has occurred, the computer system can analyze the image data for the existence of one or more converted products in the image data. If a new converted product is detected in the image data, the computer system can be configured to automatically create one or more blobs for the converted products and associate the source information with the thus-created blobs.

In one embodiment, the computer system may also include one or more Item Recognition Modules that the computer system uses to recognize and characterize items, such as converting items, in the image data. The Item Recognition Module (IRM) may include stored blobs or blob features that the computer system can use to characterize and identify a particular object in the image data. Blobs that are stored and utilized by the IRM may include blobs for converting items that are typically encountered in the processing facility. Additionally, the computer system may also be configured to identify whether a blob is a source unit or a converted product converted from a source unit. In some embodiments, the computer system may also be configured to identify the nature and/or particular type of cut removed from a source unit of food, such as a retail cut, fat, and the like. In one embodiment, the IRM can be used in combination with the ARM to determine if a new object in the image data is a meat cut.

In some embodiments, the computer system upon creating a blob for a particular item may compare the thus created blob to blobs stored in the computer system to identify the particular object. For example, the computer system may compare a blob created for converting item, such as a knife, with stored blobs in the IRM. Based on common features between the blob and the stored blobs, the computer can determine the identity of the converting item as a cutting instrument, and in particular a knife. The computer system may then use the proximity of the blob of the knife with the object being monitored to determine if a conversion activity has occurred or is in the process of occurring. As noted above, blobs for converting items, e.g., knives, saws, carts, workers, boxes, etc., that are frequently encountered in the processing facility may be stored by the computer system for use by the IRM.

In one embodiment, the ARM is configured to determine if a particular action may have resulted in the creation of converted products and additional blobs associated with the converted products. For example, the interaction of a converting item, such as knife, with respect to the object being monitored may signal to the computer system that a conversion activity has occurred. Upon determining a conversion activity has occurred, the computer system analyzes the image data for the presence of an unidentified blob associated with an object in the image data. If a previously unidentified blob is identified, the computer system may then associate the source information with the thus-identified blob. Examples of actions that may signal the occurrence of a conversion activity include sawing, chopping, slicing, and cutting actions, packaging actions, and the like. In some embodiments, the trajectory and velocity of an converting item, such as knife, with respect to an object being monitored may also signal that a conversion activity has occurred.

Figure 6:
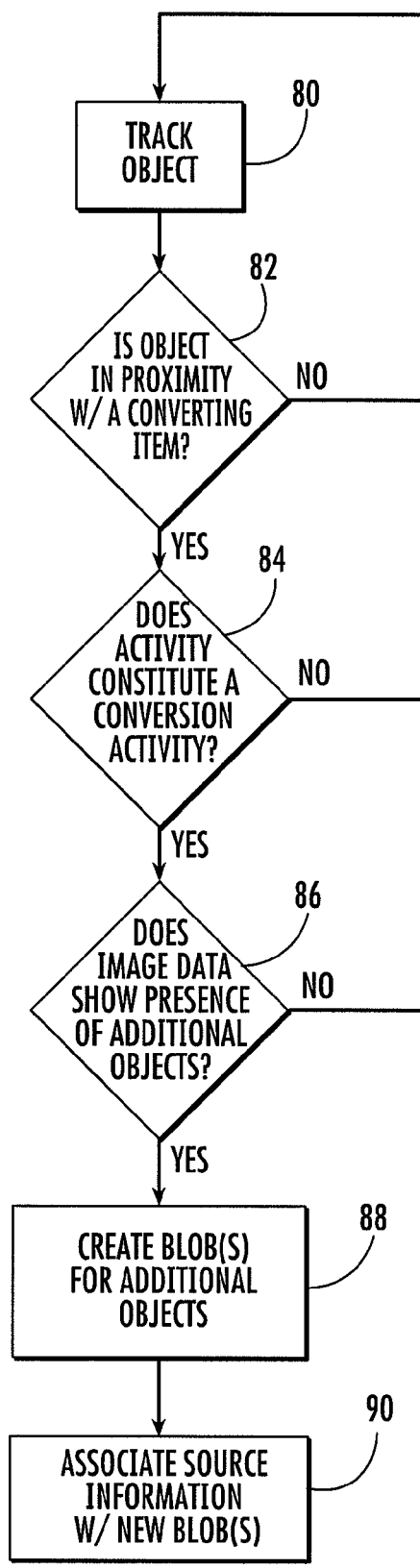
FIG. 6 is a representative flow chart of a process for monitoring an object for the occurrence of a conversion activity that results in the conversion of the object into one or more new objects.

FIG. 6 is a flow chart that represents an exemplary process that may be utilized by the computer system in determining whether a converted product has been converted from a source unit or a previously converted product. At step 80, the computer system is in the process of tracking the movements of an object for which a blob has previously been created. During tracking of the object, the computer system monitors the object for the occurrence of a conversion activity. For example, at step 82 the computer system is monitoring the object to determine if the object is in proximity with a converting item. If no interaction is detected, the computer system continues to track the movement of the object in the processing facility. If the object interacts with a converting item, the computer system determines if the activity constitutes a conversion activity at step 84. In one embodiment, step 84 may be performed by comparing the activity to stored activities in the ARM, such as interaction of a cutting instrument with the object. If the computer system determines a conversion activity has occurred, the computer system analyzes the image data for the presence of additional object(s) at step 86. If a converted product is identified, the computer system continues to track the object. If no converted products are located, the computer system continues to track the object. At step 88, the computer system creates new blobs for additional object(s) (e.g., converted products) that are identified in the image data. The source information for the object (e.g., source unit) originally being monitored can be associated with the new blob for the addition object(s) at step 90.

In some embodiments, the computer system may also include a Movement Recognition Module (MRM) that can be configured to determine if the object being monitored has been manipulated or moved so as to create a new blob for the object in the absence of an actual conversion of the object. Representative movement activities may include enclosing the object in packaging material, moving the object being monitored from one location to a second location, lifting, rotating, and the like. For example, in one embodiment rotating the object being monitored, such as flipping it over, may result in a new blob for the object being created. The MRM module analyzes the image data for the presence of movement activities and associates the source information with the new blob for the object being monitored.

In addition to an Activity Recognition Module, the computer system may also include a Location Recognition Module (LRM) that can be configured to create a new blob based on the location of the object being monitored. In one embodiment, the LRM and IRM may cooperate with each other to determine if a source unit, such as a primal cut of meat, has been converted into one or more converted products. In this embodiment, the computer system may analyze the image data for the presence of additional blobs based on the location of the object being monitored within the processing facility. If new object(s) are identified in the image data, the IRM can analyze the image data to determine if the new object(s) are converted products. If it is determined that the new objects are converted products, the computer system may create blobs for the objects and associate the source information for the original object (e.g., source unit) being monitored with the thus-created blobs for the new object(s).

In some embodiments, the LRM module may alert the computer system that the object is located in a conversion zone in the processing facility. A conversion zone generally includes locations in a processing facility where a conversion activity is likely to occur. For example, conversion zones may include packaging areas, work stations, and the like. If the computer system determines that the object is in a conversion zone, the computer system can then analyze the image data for the occurrence of a conversion activity and/or the presence of unidentified blobs. Additionally, specific locations in the processing facility may be associated with specific conversion activities. For example, if the object being monitored is moved to the packaging area of the facility, the computer system can then be configured to determine if the object being monitored is in the process of being packaged or has been packaged. As a further example, the presence of the object being monitored at a specific work station may signal to the computer system that a specific conversion activity has occurred, such as specific meat cuts being removed from a source unit being monitored. The Location Recognition Module can be configured to operate independently of, or in cooperation with, the Activity Recognition Module and/or Movement Recognition Module.

Figure 7:
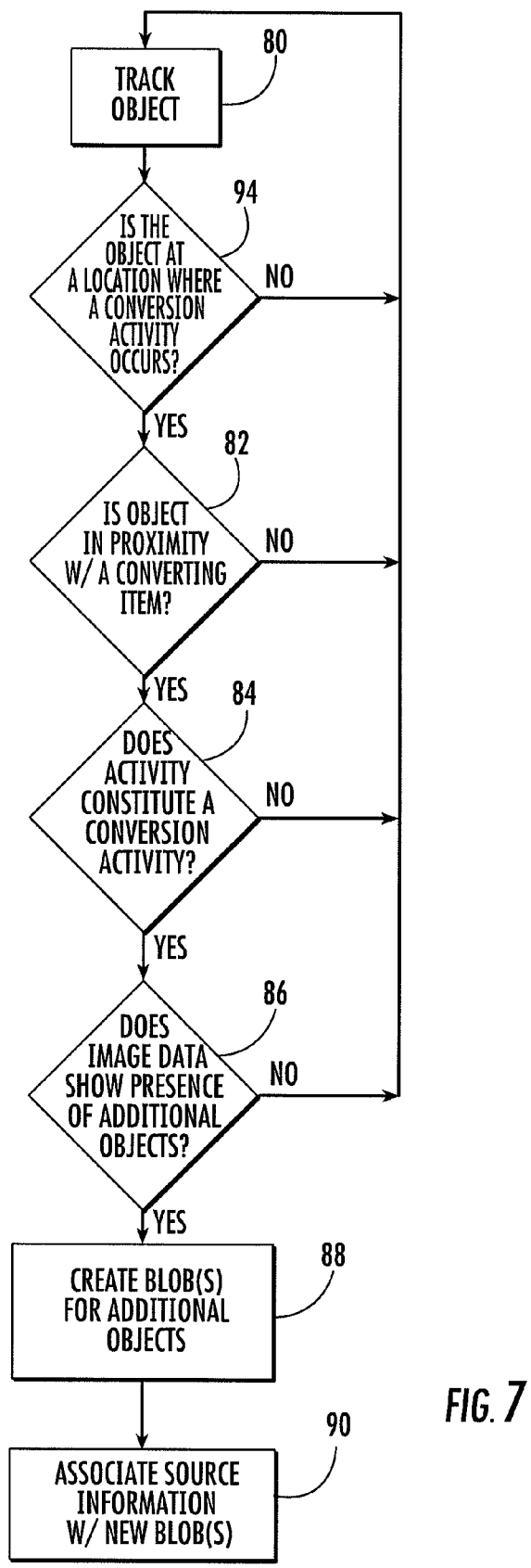
FIG. 7 is a modification of the flow chart of FIG. 6, in which the position of the object is used to indicate the possibility of the occurrence of a conversion activity.

FIG. 7 is a modification of the flow chart of FIG. 6, wherein tracking the object includes determining if the object is in a conversion zone where a conversion activity may occur. As in FIG. 6, an object for which a blob has been created is tracked by the computer system. At step 94, the computer system tracks the object to determine if it is in a conversion zone where a conversion activity may occur. If the object is determined to be in a conversion zone, the process proceeds through steps 82-90 as discussed above. If the object is not in a conversion zone, the computer system continues to track the object for the occurrence of an activity and/or movement of the object into a conversion zone. In some embodiments, the location of the object in a conversion zone can be used to determine if new blob(s) have been created in the absence of determining if a conversion activity has occurred.

FIGS. 8a through 8c represent image data that has been captured by an imaging sensor and analyzed by the computer system. As shown, the imaging sensor is positioned above two work stations and is configured to capture image data of the objects being monitored as they are converted at the two work stations. The image data in FIG. 8a includes meat cuts 98, 100 and 100a, conveyor belt 102, work stations 104, 106, knife 108, workers 110, 112 and workers' hands 110a, 110b, and 112a. In one embodiment, the computer system is configured to analyze the image data and recognize items and locations in the image data and to create blobs for the objects. In FIG. 8a the computer has performed blob analysis and created blob for various objects in the image data, such as the workers' hands 110a, 110b, and 112a, knife 108, and work stations 104, 106, that the system uses to identify the object and the extent of the blob. The rectangles surrounding the items represent a 2-D grid the computer system has created in performing the blob analysis. The rectangles/surrounding the various objects in FIG. 8a are depicted in the illustration to show an exemplary representation of the extent of the blobs.

As shown in FIG. 8a, converted product illustrated as meat cut 100a has been converted from source unit illustrated as meat cut 100 by worker 110. After meat cut 100a has been sectioned from source unit meat cut 100, the computer system recognizes the presence of a new object (i.e., converted product meat cut 100a) and creates a converted product blob for 100a that can be used to track and monitor converted product 100a as it moves through the processing facility. The computer system also associates the source information for source unit meat cut 100 with the blob for the converted product meat cut 100a. As noted above, additional information, such as time of conversion, worker identification, work station, etc., may also be associated with the blob for meat cut 100a. In one embodiment, the computer system may use the location of source unit meat cut 100, for example, to determine whether the source unit is within a conversion zone such as at work stations 104 or 106 and if so, determine whether a conversion activity may have occurred. After converting item, such as worker 110, has removed converted product meat cut 100a from source unit meat cut 100, the computer system recognizes that the source unit blob for source unit meat cut 100 no longer matches the blob of an object in the conversion zone image data, but that the blobs for two new objects have appeared-namely, first intermediate converted product 100a and second intermediate converted product 100-1 (See FIG. 8b) has been converted into a converted product meat cut.

In the time between the illustrations in FIG. 8a and FIG. 8b, worker 112 relocated first intermediate converted product meat cut 100a from the conveyor belt 102 to work station 106. Various converting items, such as the worker's hands 112a, 112b (not visible), and knife 108 interacted with the first intermediate converted product meat cut 100a. The computer system analyzed the image data of the interaction to determine if it may have constituted a conversion activity, and confirmed that a conversion activity did occur by identifying in the image data the blobs corresponding to third, fourth, and fifth converted product meat cuts 100b, 100c, and 100x, respectively (e.g., the sectioning of new meat cuts from meat cut 100a). Thus, the converting item work 112 used converting item knife 108 to convert first converted product 100a from FIG. 8a to the third intermediate converted product 100b and the fourth converted product 100c, which were placed on conveyor 102 and the fifth intermediate converted product 100x, which remains at work station 106. The computer system creates new blobs for these new converted product meat cuts 100b, 100c, and 100x, and also associates source information of source unit meat cut 100 with the blobs for the intermediate converted product meat cuts 100b, 100c, 100x. In some embodiments, the computer system may also link the information regarding the source unit and the intermediate and final converted products (e.g., meat cuts together in an information chain that extends from the original source unit to the final individual meat cuts). For example, the chain may extend from the original source unit carcass (not shown) to source unit meat cut 100, from source unit meat cut 100 to intermediate converted product meat cut 100a, and from intermediate converted product meat cut 100a to intermediate converted meat cuts 100b, 100c, and 100x, and so forth.

In FIG. 8c, worker 110 has completed processing of original source unit meat cut 100, which has been converted into an intermediate converted product meat cut and is now identified by reference character 100-2. Converting item worker 110 is depicted as reaching out for meat cut 200, to begin conversion of this meat cut into one or more converted product meat cuts.

Vision Tracking

In one embodiment, the computer system can use the blob of an object to track and identify a specific object, such as a converted product, as it moves through the processing facility. As discussed above, the system may also include an Object Tracking Module (OTM) that can be used to track the source unit/converted product(s) throughout the conversion process. The OTM can be configured to both concurrently track a plurality of objects within the monitored environment from a single imaging sensor or from multiple imaging sensors. In one embodiment, the computer system may track an object through a single camera field-of-view or among multiple camera fields-of-view. Further the OTM may be configured to track object(s) as the object(s) move between fields-of-view.

In addition to using the blob for tracking the object, the computer system may also use additional physical information, such as the weight, trajectory, velocity, surface characteristics (e.g., texture, fat lines, marbling, etc.), color, temperature, and the like can be associated with the blob and can be used to help further characterize the object being monitored. The physical information can then be used to identify the location of the object within the processing facility. For example, the velocity of a meat cut in a particular direction may be used to determine the identity of the object at various locations in the processing facility. This may be particularly useful under circumstances where the imaging sensors have momentarily lost image data of the object during tracking.

FIG. 9 is a schematic illustration of a system for tracking an identifying an object as the object is being processed in a processing facility. As shown, a blob 220 is created for an object that is being tracked in the processing facility. Blob 220, which is also characterized in FIG. 9 as "BLOB 1", is being tracked through the conversion process over a period of time. At time equals $T_0$, source information for the object has been associated with the blob 220. At various intervals during the conversion process (e.g., 222, 224, 226, and 228) additional physical information, such as velocity data, is obtained for the object being monitored. The additional physical information can also be associated with the blob 220 to further characterize the object being monitored. In the event image data of the object is temporarily unavailable, the computer system can use the additional physical information to determine the identity of the object at a subsequent location in the processing facility, for example, by using velocity and/or trajectory information of the object.

At time $T_1$, the computer system determines that a conversion activity has occurred. For example, the association of a converting item with an object being monitored. If the computer system determines that the image data includes the presence of a new blob 230 (e.g., BLOB 2), the computer system can then confirm that a conversion activity has occurred for the object at point 234. The image data also indicates the presence of new blob 232 (e.g., BLOB 3). The computer system can then associate the source information of blob 220 (e.g., source unit) with blobs 230, 232.

At time equals $T_2$, represented by reference character 236, the computer system may obtain additional physical information that can be used to further characterize the objects being monitored. At time equals $T_3$, represented by reference characters 238 and 240, additional velocity information can be associated with objects for blob 230, 232, respectively. In some embodiments, the additional velocity data may be accompanied by a location-based marker, such as a specific location of the object in the processing facility at time $T_3$. In other embodiments, the velocity data may be accompanied by an activity-based marker, such as a specific activity that is occurring to the object being monitored. The described process can continue until the conversion of the object is complete. In one embodiment, the process may continue until time equals $T_4$, represented by reference character 242. At $T_4$, the object may be packaged and the source information may be encoded or printed onto the package in which the object being tracked has been disposed.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. A method of associating a product with source information comprising:
   capturing source unit image data of a source unit of food;
   creating a source unit blob of the source unit from the source unit image data;
   associating source information that is referenced to the source unit with the source unit blob;
   converting the source unit into one or more converted products via a conversion activity, wherein the conversion activity comprises cutting, slicing, chopping, or sawing of the source unit;
   capturing converted product image data of at least one of the one or more converted products;
   creating a converted product blob of the converted product from the converted product image data; and
   associating the source information with the converted product blob.

2. The method of claim 1, further comprising the steps of moving the source unit from a first location to a second location and tracking the position of the source unit between the first and second locations.

3. The method of claim 2, wherein the step of tracking includes the step of obtaining image data of the source unit between the first and second locations.

4. The method of claim 1, further comprising the step of associating an identification code with the converted product blob.

5. The method of claim 4, further comprising the steps of enclosing at least one of the one or more converted products in a container; encoding a representation of the identification code onto a label; and attaching the label to the container.

6. The method of claim 5, wherein the label comprises an RFID tag or a machine-readable bar code.

7. The method of claim 1, wherein the steps of capturing source unit image data and creating a source unit blob occur substantially simultaneously.

8. The method of claim 1, further comprising the step of analyzing the source unit blob for the occurrence of a conversion activity.

9. The method of claim 8, further comprising the steps of creating one or more converted product blobs based on the creation of one or more converted products from the occurrence of the conversion activity, and associating the source information with the one or more converted product blobs.

10. The method of claim 8, wherein the conversion activity comprises interacting the source unit with one or more of a hand, glove, cutting instrument, packaging material, or combinations thereof.

11. The method of claim 1, further comprising the step of analyzing the source unit blob for the occurrence of a movement activity.

12. The method of claim 11, wherein the movement activity comprises one or more moving the source unit to a second location; rotating the source unit; and lifting the source unit of food.

13. The method of claim 1, further comprising the steps of:
   dividing the source unit into two or more converted products;
   capturing converted product image data for each of the two more converted products;
   creating a converted product blob for each of the converted products; and
   associating the source information with the converted product blob for each of the two or more converted products.

14. The method of claim 13, further comprising the steps of moving at least one of the two or more converted products from a first location to a second location, and tracking the position of the at least one of the two or more converted products between the first and second locations.

15. The method of claim 14, wherein the step of tracking the position of the at least one of the two or more converted products comprises continuously capturing image data of the at least one of the two or more converted products between the first and second locations.

16. The method of claim 14, wherein the step of tracking the position of the at least one of the two or more converted products comprises:
   obtaining velocity and trajectory data of the at least one of the two or more converted products; and
   determining an identity of the at least one of the two or more converted products at the second location based on the velocity and trajectory data of the at least one of the two or more converted products.

17. The method of claim 1, wherein the source information is associated with the converted product in the absence of physically applying source indicia to any one of the source unit or converted product.

18. A system for associating source information with a product that is converted from the source unit of food, the system comprising:
   a computer;
   one or more imaging sensors in communication with the computer, the one or more imaging sensors being configured and arranged in a processing facility to capture image data of one or more source units as they are converted into one or more converted products;

computer-readable program code disposed on the computer, the computer-readable program code including a first executable portion for analyzing image data and creating a source unit blob for a source unit of food, a second executable portion for associating source information that has previously been referenced to the one or more source units with the source unit blob, and a third executable portion for determining if the source unit has been converted into one or more converted products via a conversion activity, wherein the conversion activity comprises cutting, slicing, chopping, or sawing of the source unit, and wherein said third executable portion is also capable of analyzing image data of the one or more converted products and creating a converted product blob for at least one of the one or more converted products and associating the source information with the converted product blob.

19. A system according to claim 18, further comprising a fourth executable portion for tracking the position in the processing facility of one or more source units, one or more converted products, or combinations thereof.

20. A system according to claim 19, further comprising a fifth executable portion for analyzing and identifying a converting item in image data captured by the one or more imaging sensors.

21. A system according to claim 20, wherein the fifth executable portion that is configured for analyzing image data to determine if a source unit, converted product, or combination thereof is at a location where a conversion activity occurs.

22. A system according to claim 18, wherein said third executable portion is further configured for analyzing the source unit blob for the occurrence of a conversion activity.

23. A system according to claim 18, wherein said third executable portion is further configured for analyzing the source unit blob for the interaction of a converting item with a source unit, a converted product, or a combination thereof.

24. A system according to claim 18, further comprising a data entry device that is in communication with the computer.

25. A system according to claim 18, further comprising a RF transceiver that is in communication with the computer and is capable of encoding a representation of an identification code onto a label.

26. A system according to claim 18, further comprising a printer that is in communication with the computer and is capable of printing a machine readable code onto a label.

27. A system according to claim 18, further comprising an executable portion that is configured to associate a source unit blob, converted product blob, or a combination thereof with information relating to the weight, color, textural features, or temperature of the source unit, converted product for which the information was obtained.

28. A system according to claim 18, wherein the computer is operatively connected to one or more automated systems that are capable of physically interacting with one or more source units, one or more converted products, or combinations thereof.

29. The method of claim 1, wherein the source unit is animal or an animal carcass and wherein the source information includes one or more of animal type, animal lineage, date of animal slaughter, diet of the animal, or animal processing facility.

30. The method of claim 1, wherein the source unit is a cow, pig, chicken or sheep.

31. A system according to claim 18, wherein the source unit is animal or an animal carcass and wherein the source information includes one or more of animal type, animal lineage, date of animal slaughter, diet of the animal, or animal processing facility.

32. The method of claim 1, further comprising the step of associating source information that is created during the step of converting the source unit into one or more converted products with the source unit blob or with the one or more converted product blobs.

* * * * *

UNITED STATES PATENT AND TRADEMARK OFFICE
CERTIFICATE OF CORRECTION

PATENT NO. : 7,949,154 B2
APPLICATION NO. : 11/612059
DATED : May 24, 2011
INVENTOR(S) : DeLuca Page 1 of 1

It is certified that error appears in the above-identified patent and that said Letters Patent is hereby corrected as shown below:

Column 1,
Line 67, "modem" should read --modern--.

Signed and Sealed this
Twenty-ninth Day of May, 2012

David J. Kappos
*Director of the United States Patent and Trademark Office*